US009829395B2

United States Patent
Schwie et al.

(10) Patent No.: US 9,829,395 B2
(45) Date of Patent: Nov. 28, 2017

(54) AIR TEMPERATURE SENSOR ARRANGEMENT FOR A VEHICLE AND METHOD OF MEASURING AIR TEMPERATURE

(71) Applicants: Chester Miles Schwie, Burnsville, MN (US); John Timothy Otto, Shakopee, MN (US)

(72) Inventors: Chester Miles Schwie, Burnsville, MN (US); John Timothy Otto, Shakopee, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 788 days.

(21) Appl. No.: 13/713,661

(22) Filed: Dec. 13, 2012

(65) Prior Publication Data

US 2014/0169401 A1    Jun. 19, 2014

(51) Int. Cl.
  *G01K 1/12* (2006.01)
  *G01K 1/14* (2006.01)
  *G01K 13/02* (2006.01)

(52) U.S. Cl.
  CPC ........... *G01K 13/02* (2013.01); *G01K 13/028* (2013.01)

(58) Field of Classification Search
  CPC ...... G01K 13/028; G01K 13/02; G01K 13/00; G01K 1/00; G01K 1/12; G01K 1/14; F02D 2200/0414
  USPC ............................. 374/137, 138, 208, 16, 28
  See application file for complete search history.

(56) References Cited

U.S. PATENT DOCUMENTS

| | | | |
|---|---|---|---|
| 2,414,370 A | 1/1947 | Floyd | |
| 2,496,806 A | 2/1950 | Moffatt | |
| 2,496,807 A | 2/1950 | Moffatt | |
| 2,536,037 A | 1/1951 | Clousing et al. | |
| 2,588,840 A | 3/1952 | Howland | |
| 2,931,227 A | 4/1960 | Werner et al. | |
| 2,942,472 A | 6/1960 | Harney | |
| 3,000,213 A | 9/1961 | Eves et al. | |
| 3,016,745 A | 1/1962 | Simon | |
| 3,170,328 A | 2/1965 | Werner et al. | |
| 3,512,414 A | 5/1970 | Rees | |
| 4,152,938 A | 5/1979 | Danninger | |
| 4,403,872 A | 9/1983 | DeLeo | |
| 4,432,658 A | 2/1984 | Harman et al. | |
| 4,549,706 A | 10/1985 | Stickney | |
| 4,821,566 A | 4/1989 | Johnston et al. | |
| 5,302,026 A | 4/1994 | Phillips | |
| 5,466,067 A | 11/1995 | Hagen et al. | |
| 5,628,565 A | 5/1997 | Hagen et al. | |
| 5,653,538 A | 8/1997 | Phillips | |
| 5,731,507 A | 3/1998 | Hagen et al. | |

(Continued)

OTHER PUBLICATIONS

Extended European Search Report regarding related EP App. No. 13197137.6-1555; dated May 8, 2014; 7 pgs.

*Primary Examiner* — Gail Kaplan Verbitsky
(74) *Attorney, Agent, or Firm* — Cantor Colburn LLP

(57) ABSTRACT

An air temperature sensor arrangement for a vehicle includes a temperature sensor housing having a base portion, an inlet and an outlet. Also included is a main flow path defined by a continuously curvilinear wall, the main flow path extending from the inlet to the outlet for separating particulate matter from an inlet airflow. Further included is a temperature sensor disposed within an internal cavity of the temperature sensor housing.

16 Claims, 4 Drawing Sheets

(56) References Cited

U.S. PATENT DOCUMENTS

| | | | |
|---|---|---|---|
| 6,370,450 B1 | 4/2002 | Kromer et al. | |
| 6,452,542 B1 | 9/2002 | Bachinski et al. | |
| 6,490,510 B1 | 12/2002 | Choisnet | |
| 6,543,298 B2 | 4/2003 | Cronin et al. | |
| 6,609,825 B2 | 8/2003 | Ice et al. | |
| 6,622,556 B1 * | 9/2003 | May | G01K 13/02 374/135 |
| 6,651,515 B2 | 11/2003 | Bernard | |
| D497,114 S | 10/2004 | Willcox | |
| 6,809,648 B1 | 10/2004 | Fleming | |
| 6,817,240 B2 | 11/2004 | Collot et al. | |
| 6,840,672 B2 | 1/2005 | Ice et al. | |
| 6,941,805 B2 | 9/2005 | Seidel et al. | |
| 6,974,250 B2 * | 12/2005 | Severson | G01K 13/028 374/138 |
| 6,997,050 B2 | 2/2006 | Fleming | |
| 7,031,871 B2 | 4/2006 | Severson et al. | |
| 7,114,847 B2 | 10/2006 | Simeon | |
| 7,150,560 B2 | 12/2006 | Hanson et al. | |
| 7,174,782 B2 | 2/2007 | Ice | |
| D545,227 S | 6/2007 | Benning et al. | |
| D548,634 S | 8/2007 | Benning et al. | |
| D566,595 S | 4/2008 | Benning et al. | |
| 7,357,572 B2 | 4/2008 | Benning et al. | |
| 7,370,526 B1 | 5/2008 | Ice | |
| 7,441,948 B2 | 10/2008 | Bernard et al. | |
| 7,674,036 B2 * | 3/2010 | Severson | G08B 19/02 244/134 R |
| 7,854,548 B2 * | 12/2010 | Sandnas | G01K 13/02 374/109 |
| 8,157,440 B2 * | 4/2012 | Kulczyk | G01K 13/028 374/109 |
| 8,348,501 B2 * | 1/2013 | Severson | G08B 19/02 244/134 R |
| 2003/0005779 A1 | 1/2003 | Bernard | |
| 2003/0051546 A1 | 3/2003 | Collot et al. | |
| 2003/0058919 A1 | 3/2003 | Ice et al. | |
| 2004/0261518 A1 * | 12/2004 | Seidel | B64D 43/02 73/182 |
| 2005/0232331 A1 * | 10/2005 | Severson | G01K 13/028 374/128 |
| 2005/0273292 A1 | 12/2005 | Severson et al. | |
| 2009/0003408 A1 * | 1/2009 | Severson | G08B 19/02 374/16 |
| 2009/0154522 A1 * | 6/2009 | Kulczyk | G01K 13/028 374/138 |
| 2011/0013664 A1 * | 1/2011 | Benning | G01K 13/028 374/138 |
| 2014/0050247 A1 * | 2/2014 | Herman | G01K 13/028 374/138 |
| 2015/0241286 A1 * | 8/2015 | Isebrand | G01K 13/028 374/138 |

* cited by examiner

AIR TEMPERATURE SENSOR ARRANGEMENT FOR A VEHICLE AND METHOD OF MEASURING AIR TEMPERATURE

BACKGROUND OF THE INVENTION

The present invention relates to an air temperature sensor arrangement for a vehicle and a method of measuring air temperature proximate a vehicle.

Vehicles often include external air temperature measurement devices that provide useful information to an operator of the vehicle. An aircraft is an example of a vehicle that employs such devices, based on the benefits of accurate exterior air temperature knowledge. The temperature measurement devices directly provide the air temperature and additional data may be obtained inferentially from that information, such as a true airspeed of the aircraft.

Unfortunately, uncertainty of temperature readings is often observed due to a number of sources, including various flight conditions. One major error source arises from uncertainty in non-adiabatic heating of the measured air when performing deicing, referred to as deicing heating error (DHE). DHE can increase when icing of the sensor occurs, since traditional sensors regularly ice in extreme environmental conditions.

BRIEF DESCRIPTION OF THE INVENTION

According to one embodiment, an air temperature sensor arrangement for a vehicle includes a temperature sensor housing having a base portion, an inlet and an outlet. Also included is a main flow path defined by a continuously curvilinear wall, the main flow path extending from the inlet to the outlet for separating particulate matter from an inlet airflow. Further included is a temperature sensor disposed within an internal cavity of the temperature sensor housing.

According to another embodiment, a method for measuring air temperature proximate a vehicle is provided. The method includes ingesting a main flow into an inlet of a temperature sensor housing. Also included is flowing the main flow through a main flow path defined by a continuously curvilinear wall. Further included is separating particulate matter from an inlet airflow as the main flow passes through the main flow path. Yet further included is expelling particulate matter from the temperature sensor housing through an outlet. Also included is measuring a temperature of the inlet airflow with a temperature sensor disposed in a cavity at an internal location of the temperature sensor housing.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
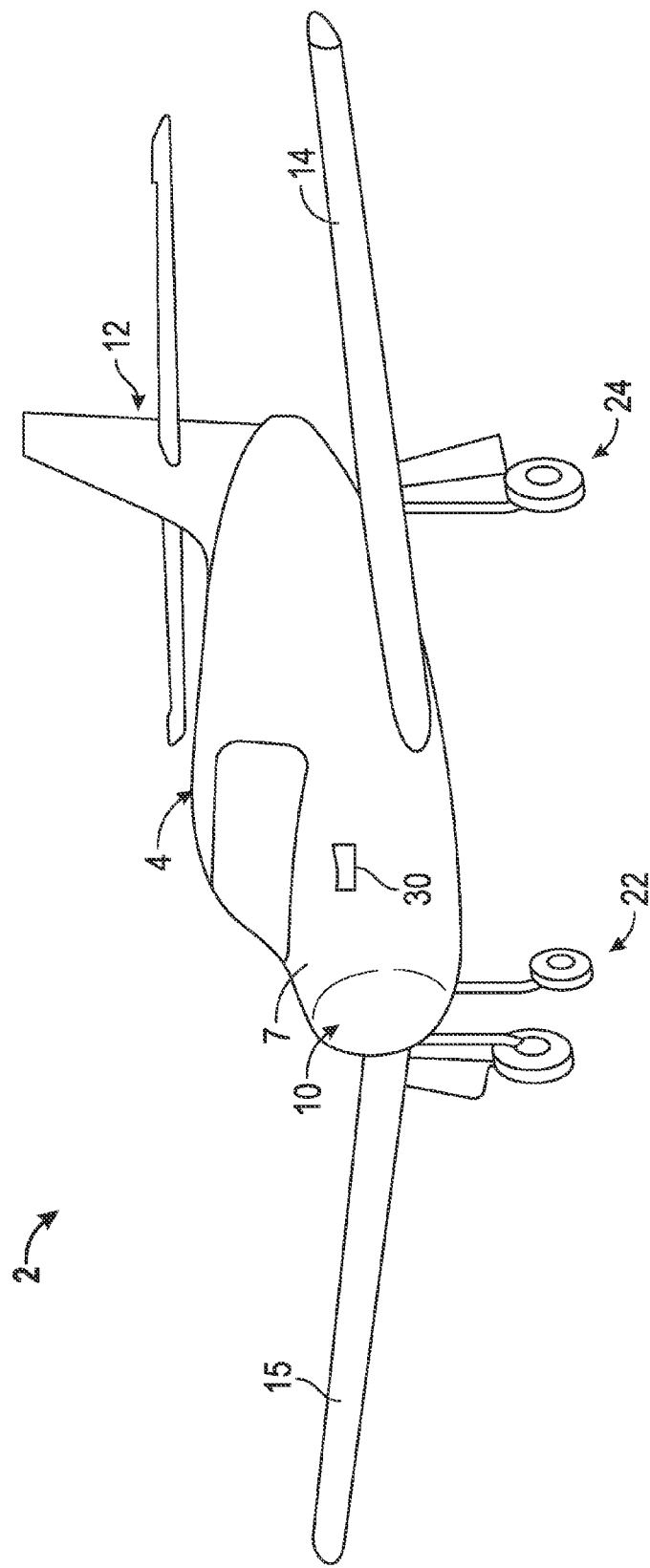
FIG. 1 is a perspective view of an aircraft.

Referring to FIG. 1, a vehicle in accordance with an exemplary embodiment is indicated generally with reference numeral 2. The vehicle 2 is shown in the form of an aircraft 4. Although illustrated as an aircraft, it is to be understood that the vehicle 2 may take on other forms. The aircraft 4 includes a fuselage 7 including a nose section 10 and a tail section 12. The aircraft 4 also includes a first wing 14 extending from a first side of the fuselage 7 and a second wing 15 extending from an opposite side of the fuselage 7. The aircraft 4 is shown to include a forward landing gear 22 arranged near the nose section 10 as well as an aft landing gear 24 mounted to the first wing 14.

An air temperature sensor arrangement 30 is illustrated as disposed proximate a surface of the nose section 10 of the aircraft 4, however, the air temperature sensor arrangement 30 may be employed at various other locations of the aircraft 4, such as proximate other areas of the fuselage 7, the tail section 12 or an engine (not illustrated), for example. The air temperature sensor arrangement 30 is configured to measure a total air temperature. Total air temperature refers to a measurement of the temperature of air at a stagnation point of air that is at rest relative to the aircraft 4. As the air is brought to rest, kinetic energy is converted to internal energy. The air is compressed and experiences an adiabatic increase in temperature. Therefore total air temperature is higher than the static (or ambient) air temperature and is a useful input to an air data computer in order to enable computation of static air temperature and hence true airspeed.

Figure 2:
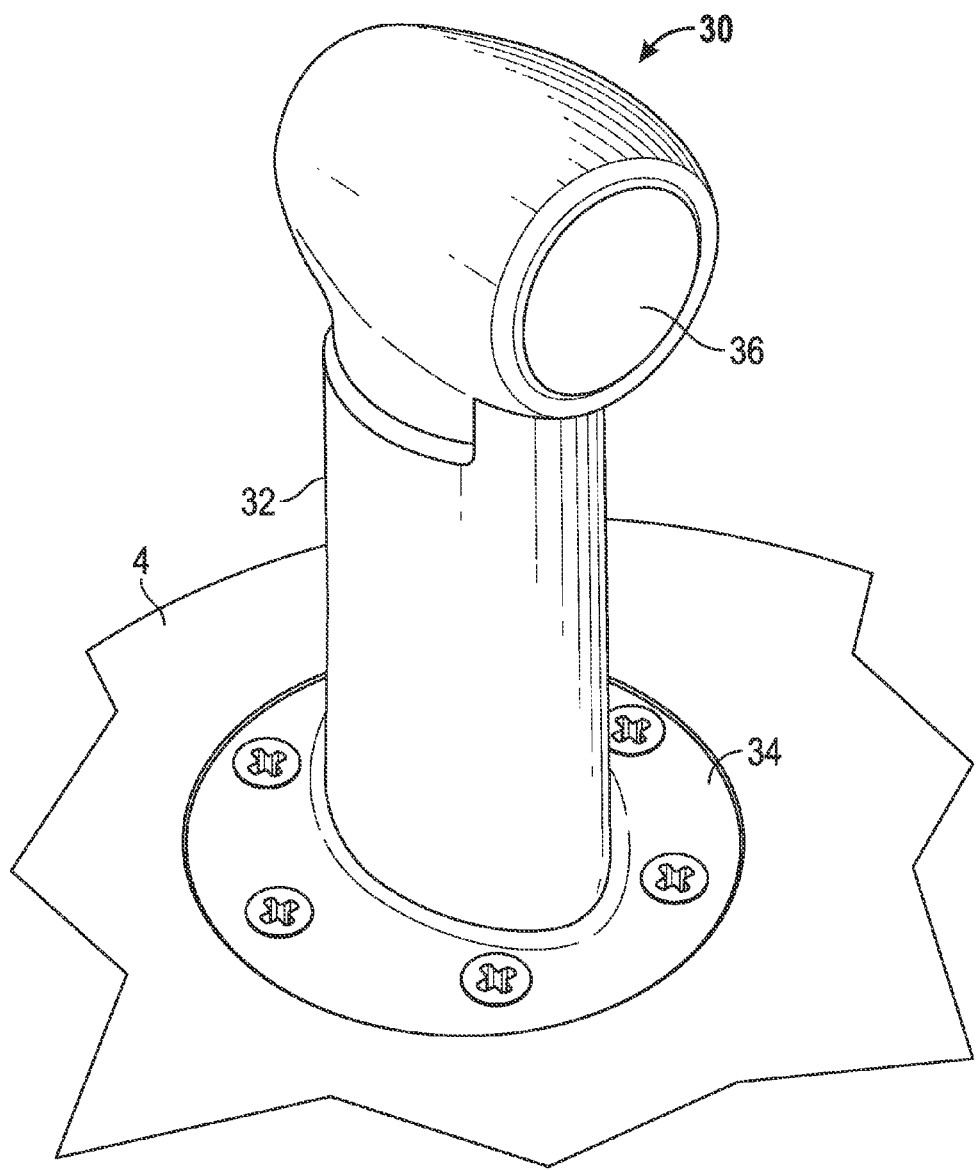
FIG. 2 is a perspective view of an air temperature sensor arrangement for the aircraft.
Figure 3:
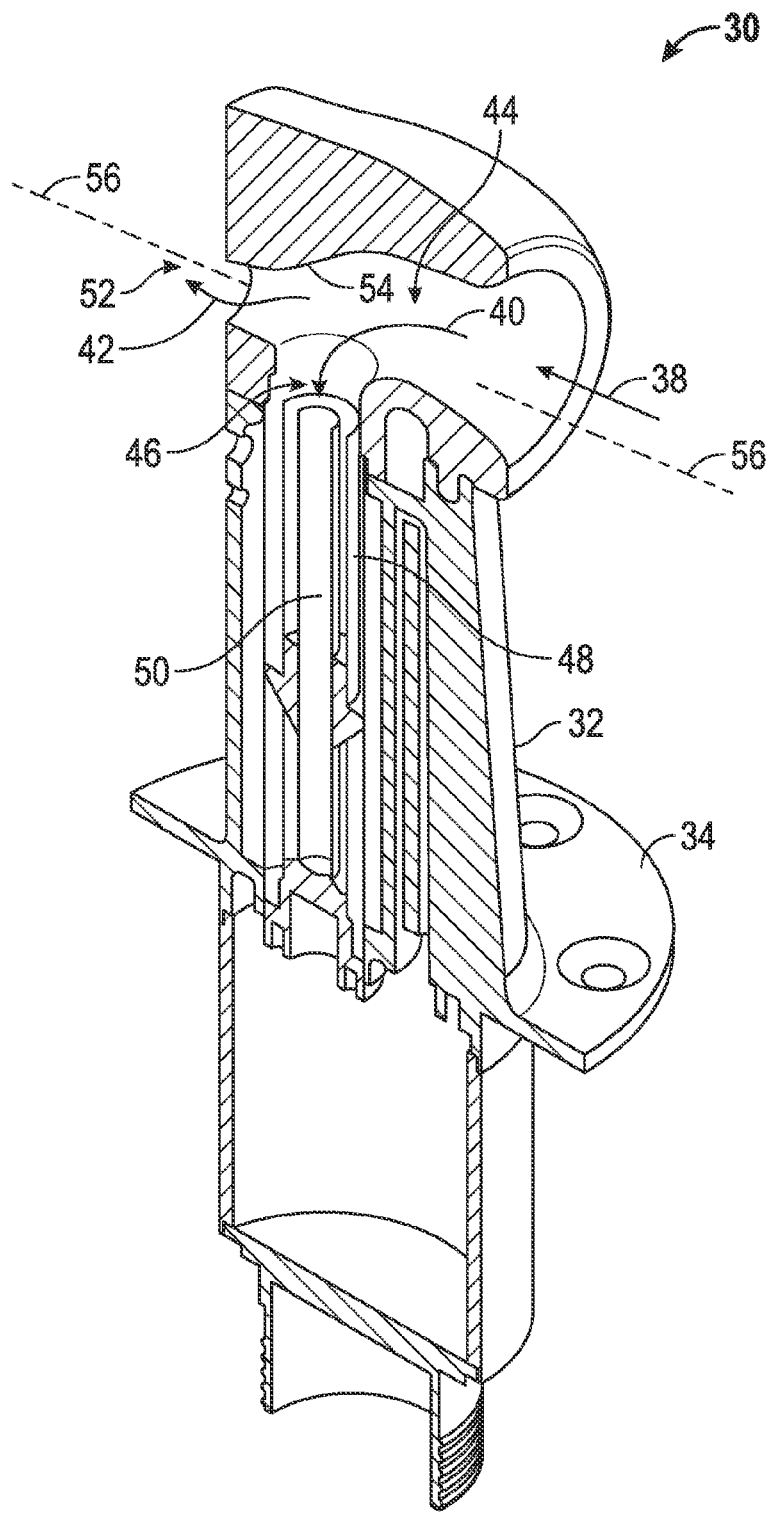
FIG. 3 is a perspective, partial cross-sectional view of the air temperature sensor arrangement.

Referring now to FIGS. 2 and 3, the air temperature sensor arrangement 30 comprises a temperature sensor housing 32 that is typically mounted to a surface of the aircraft 4 by mechanically fastening a base portion 34 to the aircraft 4. The air temperature sensor housing 32 includes an inlet 36 configured to receive a main flow 38 that includes an inlet airflow 40 and what is referred to herein as particulate matter 42. Particulate matter 42 comprises particles that are heavier than the air molecules that make up the inlet airflow 40. Examples of particles that the particulate matter 42 includes are water, ice and dust. The preceding examples are merely illustrative and the particulate matter 42 may include alternative particles. Irrespective of the specific particles included within the main flow 38, a main flow path 44 routes the main flow 38 from the inlet 36 toward a cavity inlet 46. The cavity inlet 46 leads to a cavity 48 formed within the temperature sensor housing 32. The cavity 48 is configured to house a temperature sensor 50 therein. The cavity 48 may be formed of numerous geometries and in one embodiment comprises a substantially circular cross-sectional area. As noted, several alternative geometries would be suitable for the cavity 48.

The cavity inlet 46 is located along the main flow path 44 in a radial direction between the inlet 36 of the temperature sensor housing 32 and an outlet 52 of the temperature sensor housing 32. In other words, the cavity inlet 46 is disposed downstream of the inlet 36 and upstream of the outlet 52, relative to the predominant flow direction of the main flow 38. It is proximate the location along the main flow path 44 at the cavity inlet 46 that the main flow 38 is substantially separated into the inlet airflow 40 and the particulate matter 42. The inlet airflow 40 is routed into the cavity inlet 46 into the cavity 48 for temperature measurement by the temperature sensor 50 located therein. The particulate matter 42 separated from the inlet airflow 40 continues along the main flow path 44 and is expelled from the temperature sensor housing 32 through the outlet 52.

Separation of the main flow 38 into the inlet airflow 40 and the particulate matter 42 is achieved by the geometry of the main flow path 44. The main flow path 44 is defined by a non-porous continuously curvilinear wall 54 that extends from the inlet 36 to the outlet 52, with an interruption only at the cavity inlet 46. The continuously curvilinear wall 54 is contoured to reduce boundary layer formation along the continuously curvilinear wall 54 and to avoid recirculation of the main flow 38 along the main flow path 44. The continuously curvilinear wall 54 may be contoured in numerous alternative geometries, but typically a substantially circular or elliptical cross-section is employed to account for varying incoming orientations of the main flow 38, as opposed to the inclusion of planar portions along the main flow path 44. As shown, the main flow path 44 typically funnels or tapers from a larger cross-sectional area at the inlet 36 to a smaller cross-sectional area at the outlet 52. At least one portion of the main flow path 44, such as proximate the inlet 36, may be symmetric about an axis 56. Such a portion may be located proximate the inlet 36, the outlet 52, or both. It is to be understood that the inlet 36 may be formed of various cross-sectional geometries, including circular or elliptical, for example, but these exemplary geometries noted are not intended to be limiting.

Figure 4:
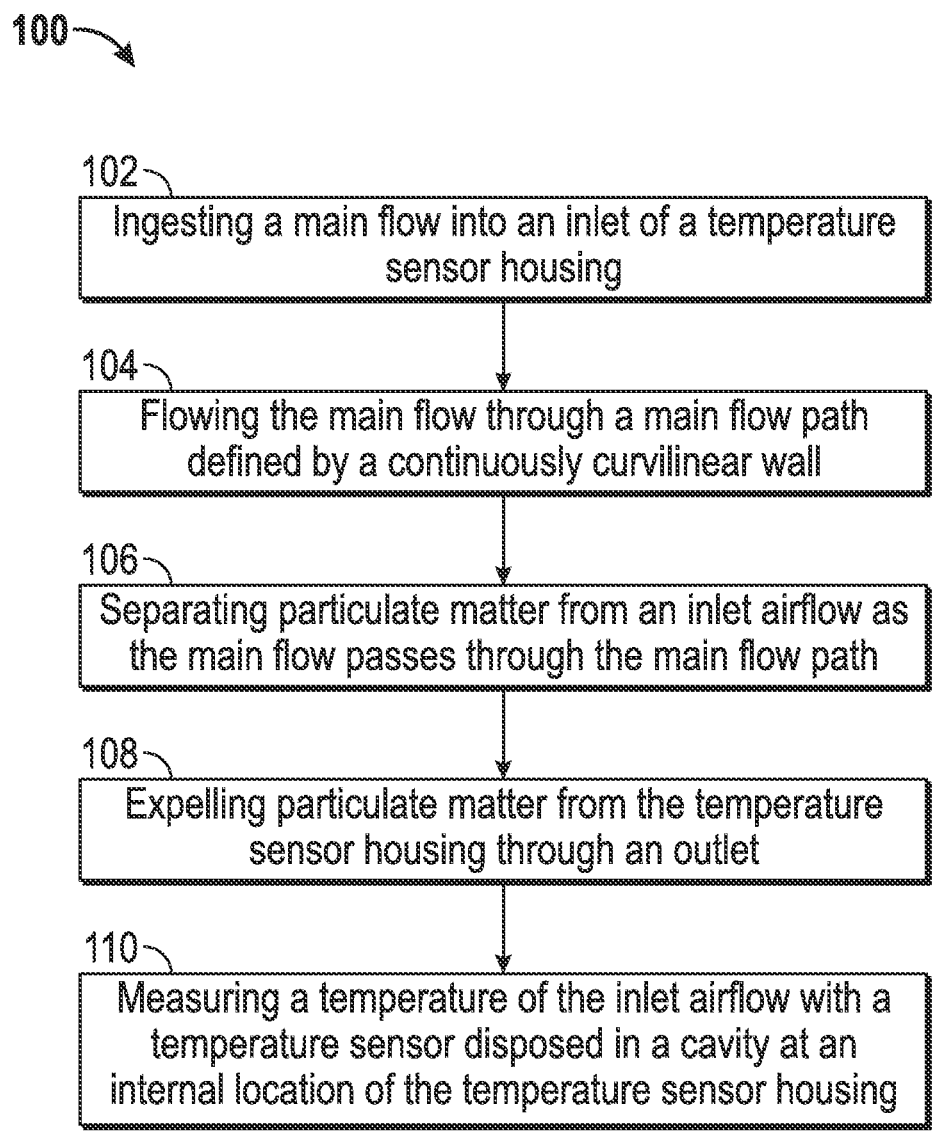
FIG. 4 is a flow diagram illustrating a method for measuring air temperature proximate a vehicle.

A method 100 for measuring air temperature proximate a vehicle 2 is also provided as illustrated in FIG. 4 and with reference to FIGS. 1-3. The aircraft 4 and more particularly the air temperature sensor arrangement 30 have been previously described and specific structural components need not be described in further detail. The method 100 for measuring air temperature proximate a vehicle 2 includes ingesting a main flow into an inlet of a temperature sensor housing in 102 and flowing the main flow through a main flow path defined by a continuously curvilinear wall in 104. Particulate matter is separated from an inlet airflow as the main flow passes through the main flow path in 106, with the particulate matter subsequently expelled from the temperature sensor housing through an outlet in 108. A temperature of the inlet airflow is measured with a temperature sensor disposed in a cavity at an internal location of the temperature sensor housing in 110.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An air temperature sensor arrangement for a vehicle comprising:
   a temperature sensor housing having a base portion, an inlet and an outlet;
   a main flow path defined by a non-porous continuously curvilinear wall, the main flow path extending from the inlet to the outlet for separating particulate matter from an inlet airflow; and
   a temperature sensor disposed within an internal cavity of the temperature sensor housing wherein the internal cavity is cylindrical in shape and the internal cavity is positioned perpendicular to the main flow path, wherein the non-porous continuously curvilinear wall is a solid, non-vented non-porous continuously curvilinear wall; and
   an opening in the non-vented non-porous continuously curvilinear wall leading to the internal cavity, the opening having a diameter equal to a diameter of the internal cavity.

2. The air temperature sensor arrangement of claim 1, wherein the inlet comprises a circular cross-section.

3. The air temperature sensor arrangement of claim 1, wherein the inlet comprises an elliptical cross-section.

4. The air temperature sensor arrangement of claim 1, wherein the inlet comprises a first cross-sectional area and the outlet comprises a second cross-sectional area, wherein the first cross-sectional area is greater than the second cross-sectional area.

5. The air temperature sensor arrangement of claim 1, wherein the base portion is secured to the vehicle.

6. The air temperature sensor arrangement of claim 1, wherein the vehicle is an aircraft.

7. The air temperature sensor arrangement of claim 1, wherein the main flow path is substantially symmetric proximate the inlet.

8. The air temperature sensor arrangement of claim 1, wherein the particulate matter separated comprises at least one of water, ice and dust.

9. The air temperature sensor arrangement of claim 1, wherein the internal cavity has a circular cross-section.

10. A method for measuring air temperature proximate a vehicle comprising:
    ingesting a main flow into an inlet of a temperature sensor housing;
    flowing the main flow through a main flow path defined by a non-porous continuously curvilinear wall;
    separating particulate matter from an inlet airflow as the main flow passes through the main flow path;
    expelling particulate matter from the temperature sensor housing through an outlet; and
    measuring a temperature of the inlet airflow with a temperature sensor disposed in a cavity at an internal location of the temperature sensor housing, wherein the cavity is cylindrical in shape and the cavity is positioned perpendicular to the main flow path, wherein the non-porous continuously curvilinear wall is a solid, non-vented non-porous continuously curvilinear wall and further comprises an opening that is circular in shape leading to the cavity, the opening having a diameter equal to a diameter of the cavity.

11. The method of claim 10, further comprising routing the inlet airflow to the cavity.

12. The method of claim 11, further comprising routing the inlet airflow to the cavity via a cavity inlet disposed along the main flow path between the inlet and the outlet.

13. The method of claim 10, further comprising fixing the temperature sensor housing to the vehicle.

14. The method of claim 13, wherein the vehicle is an aircraft.

15. The method of claim 10, wherein particulate matter comprises at least one of water, ice and dust.

16. The method of claim 10, wherein flowing the main flow through a main flow path comprises flowing the main flow through a substantially symmetric portion of the main flow path disposed proximate the inlet.

* * * * *